United States Patent
Lyon et al.

(10) Patent No.: US 7,480,936 B2
(45) Date of Patent: Jan. 20, 2009

(54) GENERIC APPLICATION ARCHITECTURE SUITABLE FOR FIREWALL TRAVERSAL

(75) Inventors: Bruce C. Lyon, Victor, NY (US); Xin Xu, Palo Alto, CA (US); Shuyuan Chen, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 917 days.

(21) Appl. No.: 10/248,381

(22) Filed: Jan. 15, 2003

(65) Prior Publication Data
US 2004/0139350 A1    Jul. 15, 2004

(51) Int. Cl.
G06F 9/00 (2006.01)
G06F 15/16 (2006.01)
H04L 9/00 (2006.01)

(52) U.S. Cl. .................. 726/11; 726/12; 709/219; 709/229; 713/153; 705/51

(58) Field of Classification Search ............. 726/11–12, 726/14–15; 709/219, 225, 229; 713/153; 705/79, 51
See application file for complete search history.

(56) References Cited

U.S. PATENT DOCUMENTS

| | | | | |
|---|---|---|---|---|
| 5,887,216 | A * | 3/1999 | Motoyama | 399/8 |
| 6,199,113 | B1 * | 3/2001 | Alegre et al. | 709/229 |
| 6,345,300 | B1 * | 2/2002 | Bakshi et al. | 709/229 |
| 6,349,336 | B1 | 2/2002 | Sit et al. | |
| 6,360,362 | B1 * | 3/2002 | Fichtner et al. | 717/168 |
| 6,480,883 | B1 * | 11/2002 | Tsutsumitake | 709/203 |
| 6,490,601 | B1 * | 12/2002 | Markus et al. | 715/507 |
| 6,615,349 | B1 * | 9/2003 | Hair | 713/165 |
| 6,687,745 | B1 * | 2/2004 | Franco et al. | 709/219 |
| 6,859,832 | B1 * | 2/2005 | Gecht et al. | 709/224 |
| 6,898,636 | B1 * | 5/2005 | Adams et al. | 709/229 |
| 7,079,982 | B2 * | 7/2006 | Ogura et al. | 702/185 |

(Continued)

OTHER PUBLICATIONS

"Axent Raptor Firewall—The best in network protection," www.c2000.com/products/sec_rapt.htm © 1995-2001 Centreline 2000.

(Continued)

Primary Examiner—Minh Dieu Nguyen
(74) Attorney, Agent, or Firm—Oliff & Berridge, PLC (57) ABSTRACT

Communication systems and methods transfer information between a client device and a vendor device through a firewall between the client device and the vendor device by using a communications protocol that will normally allows pass through the firewall and/or by e embedding the information in a file format that will normally pass through the firewall. The information can be transmitted using the hypertext transfer protocol, and/or is embedded in an HTTP document or in an e-mail message. If the client device is on a secure side of the firewall and the vendor device needs to initiate communication with the client device, the vendor device can send an e-mail message to the client device asking the client device to initiate the communication session. Because the client device has initiated the communication, the firewall should allow the response to the client device's request to pass through from the vendor device to the client device.

11 Claims, 9 Drawing Sheets

U.S. PATENT DOCUMENTS

2002/0073429 A1* 6/2002 Beane et al. ............... 725/105
2002/0141593 A1* 10/2002 Kurn et al. ................. 380/286
2002/0165784 A1* 11/2002 Taggart et al. ............... 705/26
2003/0112452 A1* 6/2003 McIntyre .................... 358/1.1
2003/0191718 A1* 10/2003 Blair .......................... 705/51
2003/0208556 A1* 11/2003 Friedman et al. ........... 709/218

OTHER PUBLICATIONS

"VelociRaptor scares off network intruders," www.itworld.com/Sec/2215/IW001204raptor/pfindex.html. © 2003 *Accela Communications, Inc.*

G. Tredoux et al., U.S. Appl. No. 09/845,104, "External Access to Protected Device on Private Network," filed Apr. 20, 2001.

* cited by examiner

GENERIC APPLICATION ARCHITECTURE SUITABLE FOR FIREWALL TRAVERSAL

BACKGROUND OF THE INVENTION

1. Field of Invention

This invention relates to systems and methods for communication between devices connected through computer network firewalls.

2. Description of Related Art

Distributed networks, such as the Internet, as a medium have created fundamental changes in the nature of how users communicate and conduct commerce. Businesses today use distributed networks, such as the Internet, not just to communicate with suppliers, employees, and customers, but also to sell products and services, to place orders, to receive orders and to provide customer service. In addition, consumers commonly use distributed networks, such as the Internet, to exchange e-mail with family members, to access financial institutions, to conduct online stock transactions, make travel reservations, shop and/or conduct research.

This explosive expansion in the use of distributed networks, such as the Internet, for e-commerce and business interaction has given rise to a need for security systems that will protect computer systems and/or networks. As the use of distributed networks, such as the Internet, has expanded, the use of network security systems limiting access to vendor or client networks has expanded as well. Network security concerns impose limits on access from a distributed network, such as the Internet, to a local computer and/or a local network. Where the requirements of limiting access to a local computer and/or a local network from a distributed network, such as the Internet, and of allowing access from the local computer and/or local network to a distributed network, such as the Internet, compete, a system can be designed to control such access.

One such system is called a firewall system. A firewall system enables a network, such as, for example, a business organization's local area network, to provide its employees access to a distinct distributed network, such as the Internet, without allowing the entire outside world access to the local network internal to that organization via that distributed network. By erecting a security barrier between the local area network and that distributed network, an organization is able to protect sensitive information that resides on the internal network.

As business organizations seek to utilize distributed networks, such as the Internet and the World Wide Web, to facilitate customer service and to improve business activity and growth, the ability of such organizations to offer services that require traversal of a firewall associated with a client's local area network in a way that does not compromise the security of the client's local area network becomes very important. In fact, the ability to provide customer service in a hands-off manner that the World Wide Web provides can possibly make or break a business deal and as a result, can impact sales.

SUMMARY OF THE INVENTION

This invention provides systems and methods that permit a firewall to be traversed.

This invention further provides systems and methods that permit the firewall to be traversed without compromising security on a local machine or network that lies on a secure side of the firewall.

This invention separately provides systems and methods that use e-mail to allow a device, machine or process located on an unsecure side of a firewall to communicate with a device, machine or process that is located on a secure side of the firewall.

This invention further provides systems and methods where the device, machine or process on the secure side of the firewall, in response to an e-mail message from a second device, machine or process on the unsecure side of that firewall, traverses the firewall to initiate a communication with that second device, machine or process.

This invention separately provides systems and methods that allow mode/view/controller applications located on both sides of a firewall to communicate through that firewall.

In various embodiments of the systems and methods of this invention, communication devices and systems allow the transfer of information from a client site device to a vendor site workstation and vice versa. This transfer of information is conducted via a distributed network.

In various embodiments of this invention, a client device with analytical, diagnostic, and upgradeable capability resides at the vendor workstation to provide input to the client device. The client device may contact the vendor site independently. The vendor workstation may receive data and information from the client site device via a vendor server. Depending on the nature of the communication, an analysis or diagnosis of one or more client devices may be performed based on the data provided by the client device. The workstation may, in turn, transmit information back to the client device via the vendor server.

In various embodiments of the systems and methods of this invention, an interactive session could be initiated between client device and vendor site during the course of scheduled communication initiated by the client device. Using various available techniques and capabilities, such as virtual private networks (VPNs), a technician at a vendor workstation may be able to directly link with the client device to perform client device diagnostics and repair without violating the client's firewall security policies.

In various exemplary embodiments of the systems and methods of this invention, the client device may be able to send and receive electronic mail, i.e., e-mail. Electronic mail can be used to send and receive instructions between the client device and the vendor site. Instructions may be embedded in an e-mail message sent from the vendor site to the client device, and/or the client device may embed maintenance and error information in an e-mail message that is sent to the vendor site.

In various exemplary embodiments of the systems and methods according to this invention, an application architecture pattern, the model/view/controller pattern, may be broadly applied to the design of various exemplary embodiments of the systems and methods of this invention. Designs based on the model/view/controller pattern use the connectivity mechanism according to this invention for connecting and interacting between devices and software.

In various exemplary embodiments of the systems and methods of this invention, the model/view/controller application architecture pattern can be implemented using the connectivity mechanism according to this invention to span firewalls, thus allowing a remote view to interact freely with a local model.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the invention will described in detail with reference to the following figures, wherein.

DETAILED DESCRIPTION OF EXEMPLARY EMBODIMENTS

In various exemplary embodiments, the systems and methods of this invention enable network communication through firewall security systems that are designed to protect and control access to network systems. Firewalls may be created or implemented using any combination of hardware devices and/or software programs, either known or hereafter developed, designed to provide any level of controlled access to a first network from sources outside the first network. These include proxy servers, screening routers, and the like using any known or later-developed filtering and screening techniques.

The following detailed description is directed to an exemplary embodiment of the systems and methods of this invention where a vendor device is located on a secure side of a firewall of a client site or network but needs to communicate with the vendor without violating the security protocols of the firewall. However, it should be appreciated that the systems and methods for securely traversing a firewall according to this invention are not limited to this exemplary embodiment, but can be used any time a firewall needs to be securely traversed.

In various exemplary embodiments of the system and methods of this invention, a first device connected to a first network effectively communicates with a remotely located second device through security firewall systems designed to protect the integrity of the first network to which the first device is connected. A distributed network to which the first network can be connected is utilized to achieve the communication. Techniques acceptable to the first network are utilized to traverse the firewall and thus allow the first and second devices to communicate without compromising the security of the firewall systems in place in the first network.

In various exemplary embodiments, communication techniques and protocols supported by the first network and the distributed network may be used to establish communication between the first device and the second device. The communication technique(s) or protocol(s) used may be predicated on the type of distributed network. For example, the hypertext transfer protocol (HTTP) may be used for communications over the Internet. Other protocols supported by the Internet may be used as well. Further, techniques supported by the first network and/or the distributed network that will establish secure connections between first and second devices may be used. The second device can itself be connected to a second network. The second network can be connected to the first network directly as the distributed network, or can itself be connected to the first network through the distributed network. For example, a virtual private network (VPN) may be established between the second network and the second device, ensuring a secure connection for transmitting sensitive information during an interactive session between the first device and the second device.

The types of the first network, the second network, and the distributed network used for transmitting and receiving information between the first and second devices may vary or differ depending on the type of systems and/or devices used.

The following description of various exemplary embodiments of the systems and methods according to this invention will be primarily directed to a vendor supplied network-connected device, referred to below as the client device, such as a network-connected printer, a network-connected digital copier, a network-connected scanner, a network-connected multi-function device, or any other known or later-developed device that is connectable to a network, that is connected at a customer site to a customer local area network, and a vendor device, such as a computer terminal used by a technician to diagnose, repair, and/or update one or more subsystems of the client network-connected device. The vendor device is connected through a vendor local area network to a distributed network, such as the Internet. The client local area network is also connected either directly, or indirectly, to that distributed network, such as the Internet.

However, it should be understood that any two network-enabled devices, where one such device is located on one side of a firewall and the other such device is located on the other side of the firewall, can use the systems and methods of this invention to communicate through the firewall.

Figure 1:
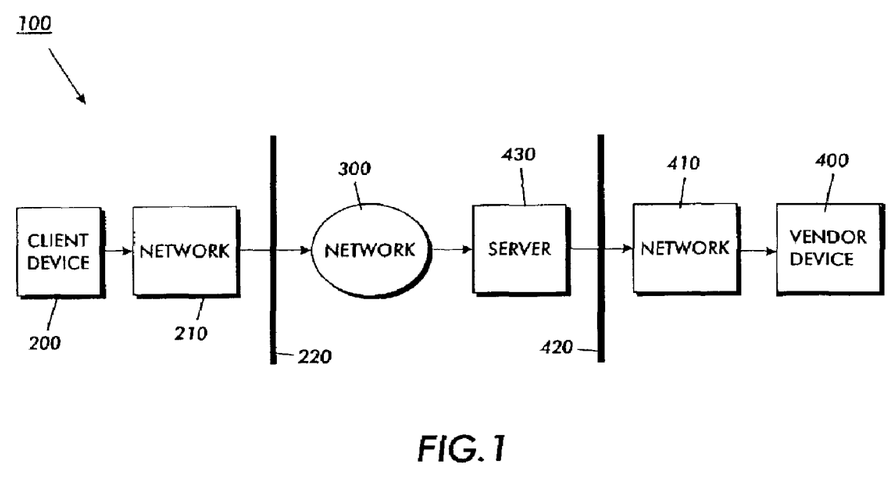
FIG. 1 is a block diagram of one exemplary embodiment of a first network connected to a second network that includes firewall protection systems.

FIG. 1 shows a block diagram of one exemplary embodiment of a data communication system 100 usable to connect a first device and a second device using the systems and methods of this invention. As shown in FIG. 1, the data communication system 100 includes a client device 200 connected to a client site internal network 210. The client site internal network 210 includes a firewall 220 that connects the client site internal network 210 to a network 300, such as a distributed network, such as the Internet. The client device 200 is thus connected through the firewall 220 to the network 300. A vendor server 430 provides connectivity from the network 300 through a vendor firewall 420 to a vendor internal network 410. A vendor workstation 400 is, in turn, connected to the vendor internal network 410.

It should be understood that, in the data communication system 100 shown in FIG. 1, the elements 200-400, while depicted separately, are not necessarily separate and distinct components. Thus, the functions and/or operations of each element may be carried out by one or more of these device elements. Further, it should be appreciated that the devices 200 and 400 in FIG. 1 may each be any device that uses a data network to achieve connectivity with another device.

As shown in FIG. 1, the client device 200 may be any device or element that may be connected to a data communication network system. Thus, the client device 200 may be any hardware device(s), for example, printers, faxes, or computers that normally may be connected to the network 300. Likewise, the vendor device 400 may be any hardware device or element that may be connected to the network 300. Thus, the vendor device 400 may be any computer terminal(s) or server(s) or any other known or later-developed device or element that is usable to communicate with the client device 200 through the network 300.

In various exemplary embodiments, the network 300 may include one or more of wide area network(s), intranet(s), the Internet or any other type of distributed network. However, the network 300 is not limited to these networks. The firewalls 220 and 420 can each be any known or later-developed combination of one or more software elements and/or one or more hardware elements that control access to the networks 210 and 410, respectively. It should be appreciated that the firewalls 220 and 420, while depicted separately, are not necessarily separate and distinct components. Thus, the functions and/or operations of the firewalls 220 and/or 420 may be carried out by any one or more known or later-developed software and/or hardware elements.

In various exemplary embodiments, the vendor server 430 may be any suitable known or later-developed general-purpose computer or other device that prevents unauthorized access to the internal network 410. For example, the vendor server 430 may include one or more proxy servers that provide an extra level of security by restricting outside entities from connecting to the internal network 410 unless authorized and authenticated to do so. Each of the client network 210 and the vendor network 410 may include any wired or wireless system and connecting hardware devices within a given location or area, for example, a local area network or an Internet or any other distributed network system.

The vendor device 400 may be any hardware device capable of receiving and transmitting data and information over the data network 300. The vendor device 400 may be implemented as a programmed general purpose computer, on a special purpose computer, a programmed microprocessor, an ASIC or other integrated circuit device or programmable logic device such as a PLD, PLA, FPGA or PAL, or the like. In general, any device capable of implementing and processing data and information from a data network may be used as the vendor device 400.

Figure 2:
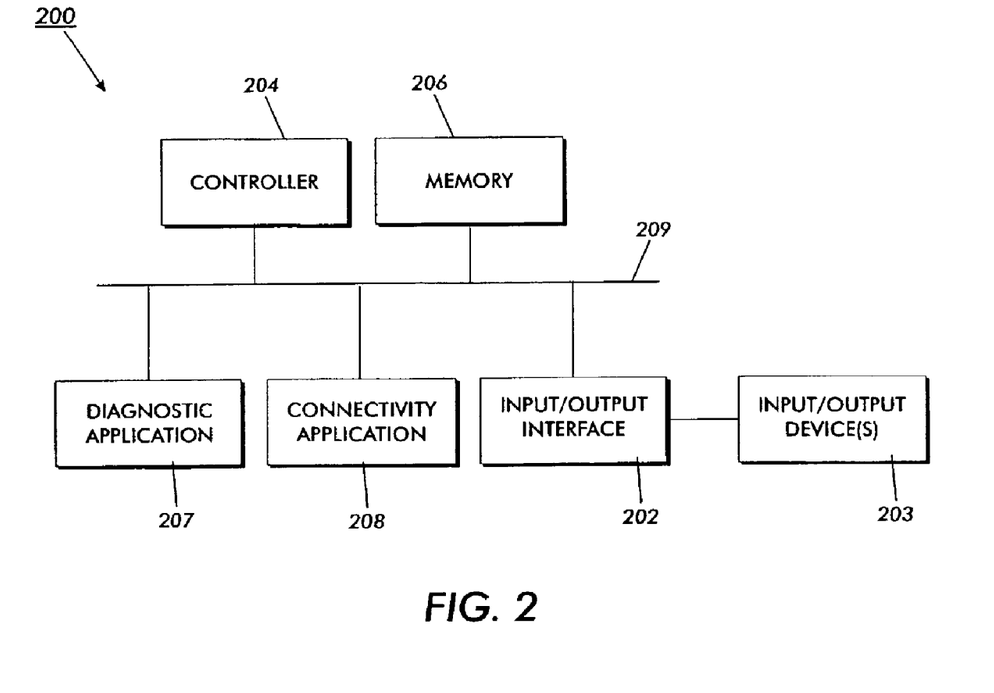
FIG. 2 is a block diagram of one exemplary embodiment of the first network.

FIG. 2 is a block diagram illustrating in greater detail one exemplary embodiment of the client site device 200. As shown in FIG. 2, the client site device 200 includes one or more of an input/output device 202, one or more input devices and/or one or more output devices 203, a controller 204, memory 206, a diagnostic circuit, routine or application 207, and a connectivity circuit, routine or application 208. The elements 202-208 may be connected together by one or more data and/or control busses and/or application programming interfaces 209.

The memory 206 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a writable or rewritable optical disk and disk drive, a hard drive, flash memory or the like. Likewise, the non-alterable or fixed memory can be implemented using any one or more of ROM, PROM, EPROM, EEPROM, an optical disk ROM disk such as a CD ROM or DVD ROM disk, and disk drive or the like.

The diagnostic circuit, routine or application 207 can include a circuit and/or a software program that performs quantitative analysis of the client site device 200. This includes, but is not limited to, one or more of health and maintenance information of the client site device 200, diagnostic analysis of systems and hardware of the client site device 200, and other analysis and diagnostic analysis of the device that may be necessary or desirable to maintain and/or operate the client site device 200.

In various exemplary embodiments, the connectivity circuit, routine or application 208 can include a circuit and/or a software program that connects the client site device 200 to the network 300. The connectivity circuit, routine or application 208 connects the client device 200 to the network 300 in a manner that is compatible with the network 300 and the client internal network 210, so that communication through the firewall 220 can occur according to the systems and methods of this invention. For example, the client internal network 210 may have a T1 line connection to the network 300 via the firewall 220. In this case, the T1 connection enables the client device 200 to connect through the firewall 220 to the network 300. The connectivity circuit, routine or application 208 is thus able to communicate with the vendor server 430.

The input/output device 202 allows devices of the client to connect to the client internal network 210 and enables information to be transmitted to and received by the client site device 200. For example, the client site device 200 connects to the client internal network 210 through the input/output device 202.

It should be appreciated that, in various exemplary embodiments, the client site device 200 can be a device that may require vendor servicing. As such, determining the condition of the client site device 200 may vary based upon the vendor's and/or the client's requirements. For example, the client site device 200 could contact the vendor server 430 on a scheduled basis to provide information to the vendor device 400 about the system conditions present at the client site device 200. For a photocopier, such system conditions can include toner condition, photoreceptor status, hardware status, and the like.

The client site device 200 can be programmed to connect to the vendor server 430 on a periodic basis to check the vendor server 430 for software updates to download from the vendor server 430, to upload performance or other information of interest or concern to the vendor server 430, or even to check for marketing or other vendor information of possible interest to the client. Downloaded information such as, for example, a software upgrade or a trade-in offer for the client site device 200, could then be displayed on an output device of the one or more input or output devices 203 or by the client's own internal web server.

The client site device 200 may initiate a connection with the vendor server 430. The controller 204 establishes the connection via the connectivity circuit, routine or application 208 through the firewall 220 to the vendor server 430. The connection may be at scheduled intervals, for example, for scheduled maintenance, or, may be an unscheduled connection due to a detected system fault resulting from an analysis performed by the diagnostic circuit, routine or application 207. For example, the controller 204 may repeatedly poll the vendor server 430 to check if the vendor workstation 400 is ready for an interaction session. Once an interaction session is ready, a private, secure connection, such as a virtual private network (VPN) connection, may be established between the client device 200 and the vendor workstation 400 via the vendor server 430 and service may be provided by the vendor. Any instructions sent by the vendor device 400 may be received and uploaded by the controller 204.

Figure 3:
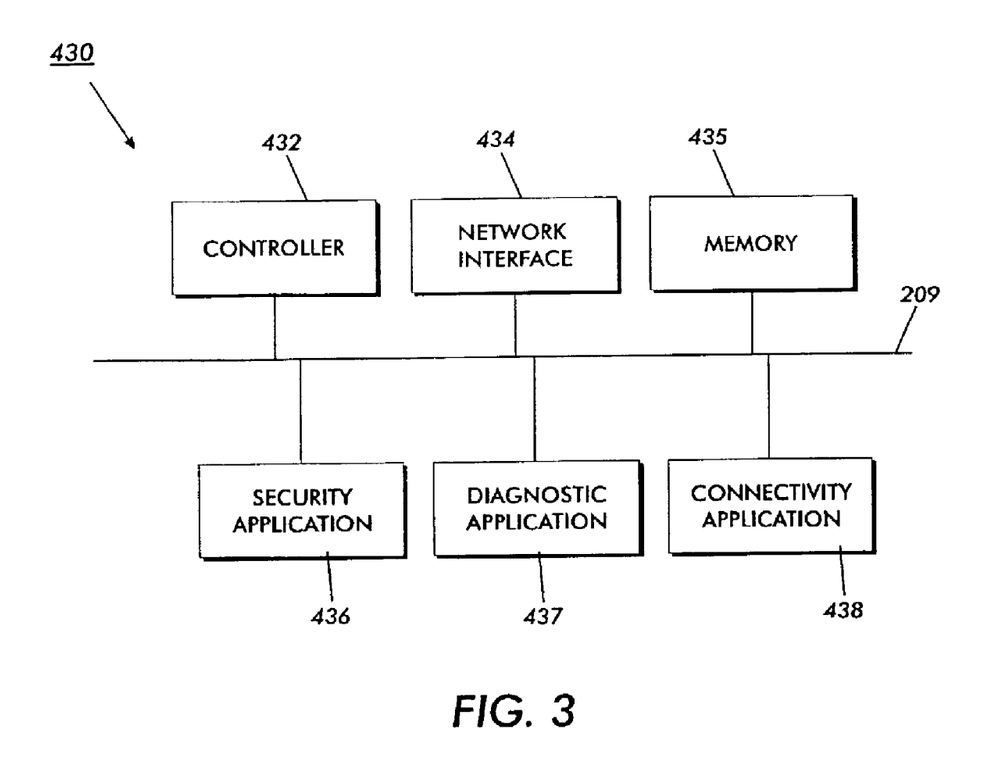
FIG. 3 is a block diagram of one exemplary embodiment of a communication server according to this invention.

FIG. 3 is a block diagram outlining in greater detail one exemplary embodiment of the vendor server 430. As shown in FIG. 3, the vendor server 430 includes one or more of a controller 432, an input/output device 434, memory 435, a security circuit, routine or application 436, a diagnostic circuit, routine or application 437, and a connectivity circuit, routine or application 438. All of these elements 432-438 may be connected together by one or more common control and/or data busses and/or application programming interfaces 439.

As shown in FIG. 3, the memory 435 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or rewritable optical disk and disk drive, a hard drive, flash memory or the like. Likewise, the non-alterable or fixed memory can be implemented using any one or more of ROM, PROM, EPROM, EEPROM, an optical disk ROM disk, such as a CD-ROM or DVD-ROM disk, and disk drive or the like.

The security circuit, routine or application 436 can include any circuit and/or software program that performs an authentication and/or authorization protocol procedure to identify users accessing the vendor server 430 and to allow or deny access to the vendor device 400 from the network 300. The security circuit, routine or application 436 may be implemented using any known or later developed software package.

The diagnostic circuit, routine or application 437, like the diagnostic circuit, routine or application 207 of the client site device 200, can include a software program. The diagnostic circuit, routine or application 437 may be designed to handle analysis of various vendor devices remotely located at various client sites.

Likewise, the connectivity circuit, routine or application 438 can include a software program that connects the vendor server 430 to the network 300 and that provides a connection between the vendor server 430 and the vendor's internal network 410.

The connectivity circuit, routine or application 438 may connect to the network 300 in a manner that is compatible with the network 300 and the vendor's internal network 410 and compatible with the procedures and protocols of the firewall 420. For example, the vendor network 410 may utilize a T1 line connection to the Internet, which enables the vendor server 430 to provide connectivity for the vendor internal network 410 through the firewall 420 to the network 300. The connectivity circuit, routine or application 438 is then able to access the client device 200, enabling data and/or information to be exchanged between the client site device 200 and the vendor device 400 or the vendor server 430.

Any contact by the client device 200 is received by the controller 432 through the input/output device 434 and sent to the security application 436 for authentication. Using any known or later-developed authentication process, the client device 200 may be identified as a vendor product and authorized access to the vendor internal network 410. Depending on the nature of the contact, the controller 432 may connect the client device 200 to a vendor technician workstation 400. If it is a scheduled contact requiring, for example, a status dump to the vendor, then the controller 432 may initiate a downloading of the information into memory 435 and later included in a status report of vendor devices at various client sites, for example.

For unscheduled contacts, for example, a device system failure requiring a technician input, the controller 432 may provide a connection via the connectivity circuit or application 438 to a technician workstation 400. Depending on the immediacy of the answer and the time to work a solution, the controller 432 may require the client device 200 to contact the server 430 at fixed intervals to see if an answer is available for downloading. If instructions are to be downloaded, the technician may load the information into the server memory 435 so it is available when the client device 200 makes contact. Otherwise, the controller 432 may establish a direct connection, such as, for example, a virtual private network (VPN), between the technician workstation 400 and the client device 200 to enable the technician to troubleshoot the problem in the client device 200.

Figure 4:
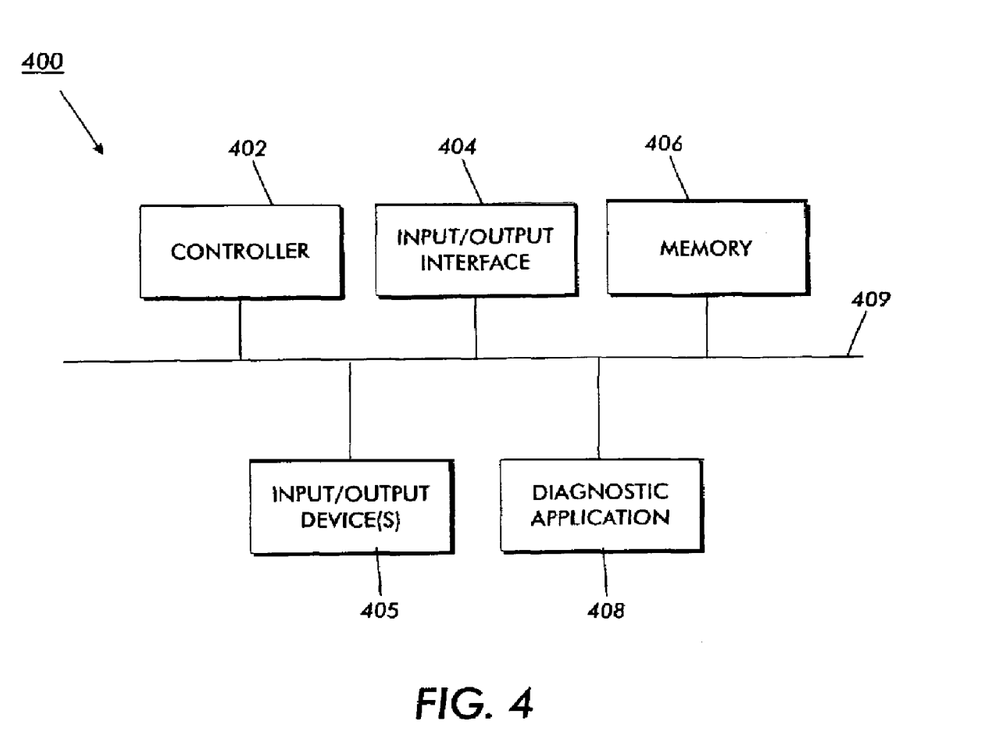
FIG. 4 is a block diagram of one exemplary embodiment of the second network.

FIG. 4 shows a block diagram outlining in greater detail one exemplary embodiment of the vendor workstation 400. The vendor workstation 400 includes a controller 402, an input/output device 404, one or more input devices and/or one or more output devices 405, memory 406, and a diagnostic circuit, routine or application 408. All the elements may be connected together by one or more common control and/or data busses and/or application programming interfaces 409. It should be appreciated that FIG. 4 shows the workstation 400 with the various elements in a functional manner rather than a structural manner. Further, the elements in FIG. 4 represent a functional capability of a workstation 400 that enables the workstation 400 to receive and transmit data and information over the vendor internal network 410. It should be appreciated that the workstation 400 may be any general purpose computer or special purpose computer capable, a programmed microprocessor, an application specific integrated circuit, peripheral integrated circuit elements, or other integrated circuit or logic circuit such as a discrete element circuit, a programmable logic device such as a PLD, PLA, FPGA or PAL or the like.

As shown in FIG. 4, the memory 406 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or rewritable optical disk and disk drive, a hard drive, flash memory or the like. Likewise, the non-alterable or fixed memory can be implemented using any one or more of ROM, PROM, EPROM, EEPROM, an optical disk ROM disk, such as a CD-ROM or DVD-ROM disk, and disk drive or the like.

The diagnostic circuit, routine or application 408, like the diagnostic circuits, routines or applications 207 and 437 of the client site device 200 and the vendor server 430, respectively, may include a circuit and/or a software program that performs quantitative analysis on data received from the client site device 200. Depending on the type of contacting client site device 200 and/or type of problem to be resolved, this may result in different workstations 400 being accessed. The information is received through the input/output device 404 by the controller 402.

The controller 402 may display the information on an output device of the one or more input and/or output devices 405 to a technician. Depending on the response of the technician, the controller 402 may access the diagnostic circuit, routine or application 408 to conduct further analysis of the information provided by the client site device 200. If needed, the technician may establish an interactive session with the client site device 200, via the vendor server 430, using, for example, a virtual private network (VPN) connection. If no interaction session is required or desired, device updates and instructions may be placed on the vendor server 430 to be downloaded to the client device 200 when the client site device 200 next contacts the vendor server 430.

It should be appreciated that other techniques for transferring information may be employed including, but not limited to, the use of Hyper Text Mark-up Language (HTML) pages that may be used with Internet-based devices. If the security policy of the client site network 210 permits, the client device 200 could be set up with an electronic mail address. Using open or encrypted e-mail messages, instructions and information could be embedded into electronic mail messages and sent from the vendor workstation 400 across the client site firewall 220.

For example, the firewall 220 can restrict the kind of traffic that may be allowed to pass over the network 300 from the server 430 and/or the vendor workstation 400 to the client device 200. Thus, the firewall 220 is a barrier to distributed-network-connectivity between the client device 200 and the server 430 and/or the vendor workstation 400 when the client device 200 is behind, i.e., on the secure side of, the firewall 220. In general, most firewalls 220 will not allow the server 430 or the vendor workstation 400 to initiate contact through the firewall 220 to the client device 200. In general, the firewall 220 will also not allow a direct connection initiated by the client device 200 through the firewall 220 to either the server 430 or the vendor workstation 400.

Accordingly, in various exemplary embodiments of the systems and methods of this invention, the client device 200 initiates all of the communications with the server 430 and/or the vendor workstation 400 by behaving like a connection or application, such as a browser used to browse the distributed network 300, that the firewall 220 is authorized to let pass from the secure side to the non-secure side of the firewall 220. Most firewalls 220 allow many kinds of outbound connections from the client device 200, such as, for example, hyper-text transfer protocol (HTTP) and the file transfer protocol (FTP) connections, to pass through the firewall 220. This allows the client device 200 to use an HTTP connection to access the communications server 430 and/or the vendor workstation 400 through the firewall 220 and over the distributed network 300. This, thus, implements a distributed-network-based connectivity between the client device 200 and the communications server 430 and/or the vendor workstation 400.

For example, the client device 200 could be a network device that is installed on the client network 210, such as a customer local area network, behind the firewall 220. In this case, the firewall 220 allows outbound hyper-text transfer protocol (HTTP) messages to traverse the firewall 220 to support a browser used to browse the network 300. When the client device 200 needs to communicate with either the server 430 or the workstation 400, the client device 200 initiates a hyper-text transfer protocol (HTTP) connection with the communications server 430 through the firewall 220 and over the network 300. Although the hyper-text transfer protocol (HTTP) is not a full-fledged client/server protocol, it could still be used by the vendor workstation 400 to implement an interactive session with the client device 200. For example, after the client device 200 uses a message in the hyper-text transfer protocol (HTTP) to establish a connection with the communications server 430, the communications server 430 can initiate a virtual private network (VPN) connection through the firewall 420 to the vendor workstation 400.

It should be appreciated that, while the foregoing discussion refers to the hyper-text transfer protocol (HTTP) and virtual private networks (VPNs), any known or later-developed communication protocol that the firewall 220 normally permits to pass to establish a communications connection from the client device 200 to the network 300 can be used by the client device 200. Similarly, any known or later-developed communication technique that the communications server 430 can use to traverse the firewall 420 to establish a communications connection with the vendor workstation can be used to traverse the vendor firewall 420.

It should also be appreciated that, if the firewall 220 uses a proxy server to pass the hyper-text transfer protocol (HTTP) requests, then the address of the proxy server should be provided to the client device 200 before the systems and methods according to this invention can be fully implemented. Of course, it should be appreciated that should the address of the proxy server used by the firewall 220 be changed, the client device 200 should be provided with this information. Similarly, the address on the distributed network of the communications server 430 should be provided to the client device 200 to fully implement the systems and methods according to this invention.

It should be appreciated that the client device 200 can also be provided with an X.509 certificate to allow the client device 200 to authenticate itself to the communications server 430. The communications server 430 can also be provided with an X.509 certificate so that the client device 200 can be sure that it has connected to the communications server 430 and not some other, perhaps malevolent, device connected to the network 300.

It should further be appreciated that secure socket layer (SSL) technology could be used to protect the communications sessions between the client device 200 and the communications server 430 from eavesdropping by unauthorized parties over the distributed network 300. Most importantly, it should be appreciated that using the hyper-text transfer protocol (HTTP) in this manner does not require that the communications server 430 or the vendor workstation 400 to have any information about the address of the client device 200 on the client site network 210.

Figure 5:
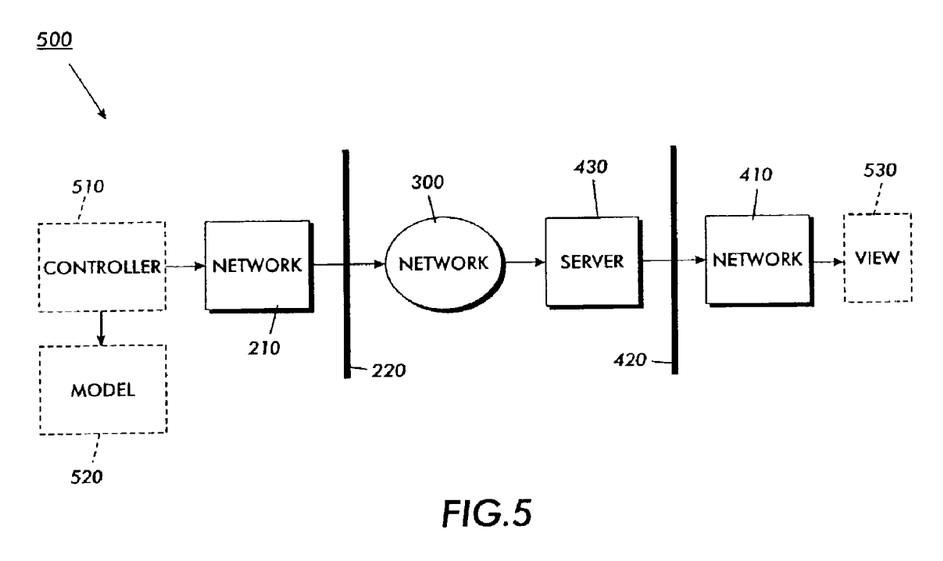
FIG. 5 illustrates a first exemplary embodiment using the model/view/controller architecture with the first network and the second network, connected through a firewall according to this invention.

FIG. 5 shows a block diagram of one exemplary embodiment 500 of the invention, in which various exemplary embodiments of the data communication systems and methods according to the invention are applied to the model/view/controller application architecture pattern. The model/view/controller pattern defines roles for the software elements implementing a system in which users interact with data. The model 520 encapsulates one or more data items and responds to inputs and queries by altering or reporting the data. The model 520 may also originate events in response to changes in the state of the model 520. Such changes can be triggered by some agent or can occur autonomously. The view 530 presents selected information about the model 520 and receives user inputs or actions. The controller 510 coordinates the interactions between the model 520 and the view 530. It should be appreciated that, in the model/view/controller pattern, it is common for multiple views to represent different aspects of the same model.

For example, the model 520 could be a software element that implements a printer's job queue. In this example, the model 520 would be updated and would generate update events when, for example, jobs are completed or change status, and would respond to commands that, for example, add or delete jobs. The model 520 might be resident on the physical printing device, it might be resident on a general-purpose computing platform, such as a server, or it might be distributed between the printer and the server. In this example, the view 530 can be implemented by one or more graphical user interface screens that display the current state of the printer's job queue and the jobs in the queue, and responds to update events from the model 520. The view 530 would also generate user interface events in response to user actions, such as selecting a job to be deleted or submitting a new job. The controller 510 would respond to user events generated by the view 530 and would direct commands or queries to the model 520.

As shown in FIG. 5, various exemplary embodiments of the systems and methods according to this invention include the model/view/controller architecture pattern. In the exemplary embodiment shown in FIG. 5, the model 520 is coupled with the controller 510 located at the client site and is connected to the client network 220. The view 530 is located at the vendor site and is attached to the vendor network 410. The model 520 and the controller 510 act to represent the client device 210 to the remote view 530. Using the previously-discussed embodiments of the systems and methods of the invention that enable communication between devices separated by firewalls, user interface events from the view 530 can be communicated to the controller 510 and/or to the model 520, thus extending the model/view/controller application architecture pattern across the intervening network 300.

It should be understood that in the exemplary embodiment of the second data communication system 500 shown in FIG. 5, the software elements 510-530, while depicted individually, do not necessarily need to be implemented as separate and distinct software components. Thus, the functions and operations assigned to each of these components 510-530 in the forgoing discussion could be assigned differently, possibly resulting in a different number of components.

Figure 6:
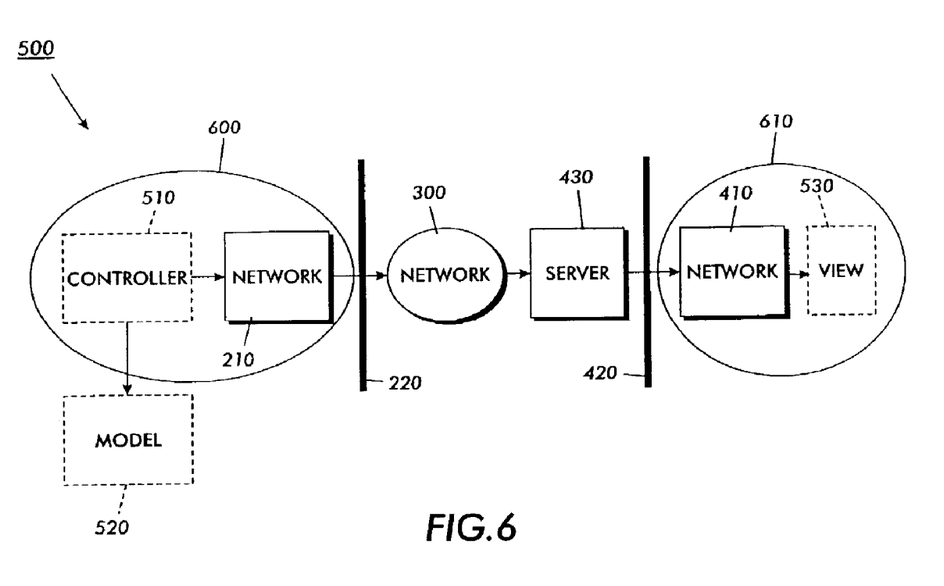
FIG. 6 illustrates a second exemplary embodiment of the first network and the second network connected through a firewall according to this invention.

FIG. 6 illustrates an alternative exemplary implementation of the second data communication system 500 shown in FIG. 5. In this exemplary embodiment, the model/view/controller application architecture pattern is instantiated by the applications 600 and 610. Using various exemplary embodiments of the systems and methods according to this invention, the applications 600 and 610 can communicate using any of the protocols and capabilities that are supported by the network 300. These applications 600 and 610 do not need to be restricted to device administration or diagnosis. For example, the applications 600 and 620 could both be browser applications that send and receive communications that are displayed in a graphical user interface.

Some network protocols, such as the Hyper-Text Transfer Protocol (HTTP), enable commands to be embedded in messages that can be sent across the public network 300. In most firewall configurations, the client firewall 220 would be set to deny access to the client network 210 from the network 300, thus preventing the vendor workstation 400 from sending commands to the client device 200. However, most client firewall configurations would allow outbound communications from the client device 200 to the public network 300. Thus, the application 600, perhaps implemented as a browser, could access an HTML page on a vendor server 430 that contains embedded applications, which may then be downloaded to the client device 200. The client firewall 220 would typically allow this operation when it is initiated by the client device 200.

The key to understanding how the invention is applied to the model/view/controller pattern is to understand that, in many network protocols, such as the hyper text transfer protocol, a device on the unsecured side of the client firewall, such as the vendor workstation 400 or the vendor server 430, is not allowed to initiate any communication with a device on the secure side of the client firewall, such as the client device 200, when trying to communicate with the client device 200, such as to diagnose a problem, from a remote location, for example, to save the cost for sending a service person to the site of the client device 200, the client device 200 will need to start the communication. The client device 200 sends the data and the reference HTML page to the second device. The second device will then be able to access the same information as the client device 200. The second device then responds to what the client device 200 needs the second device to do, either by supplying a final answer or by asking more questions in the response. Since client device 200 has the model, by looking at the response from the second device, the client device 200 knows what to display to get the question posed by the second device or that the question/answer exchange has been completed.

Figure 7:
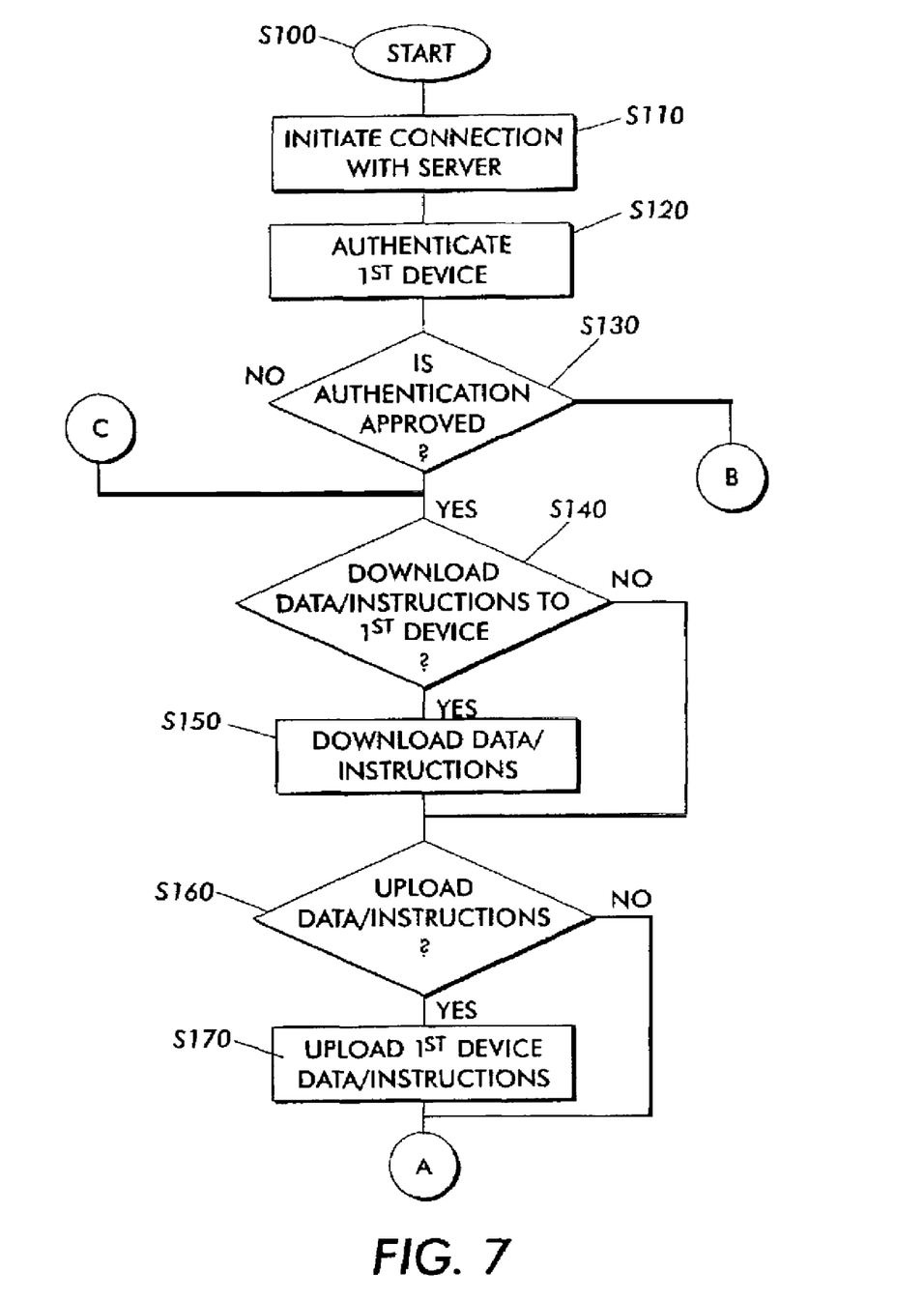
FIGS. 7 and 8 are a flowchart outlining a first exemplary embodiment of a method for traversing a firewall security system of a network according to this invention.
Figure 8:
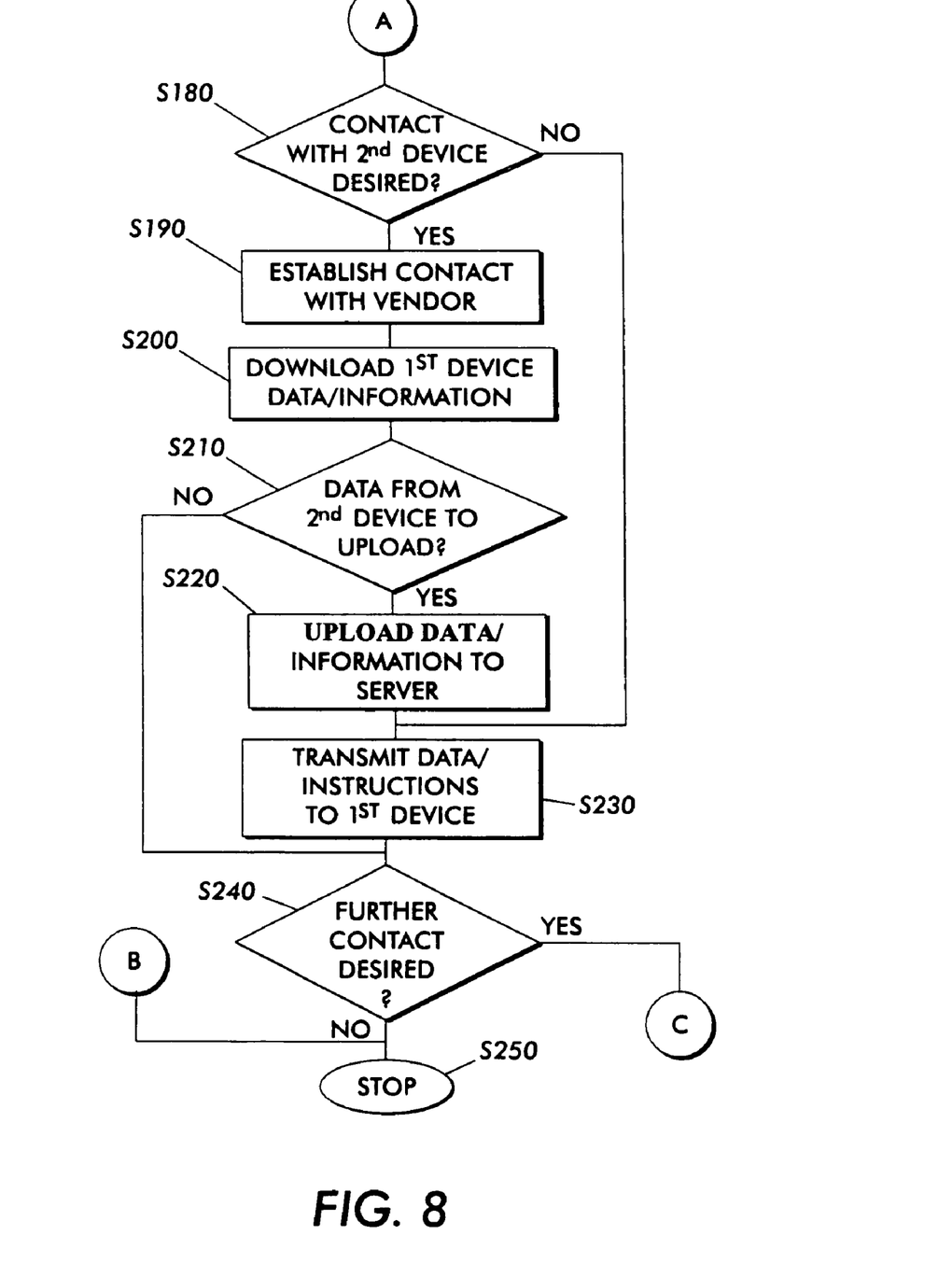

FIGS. 7 and 8 are a flowchart outlining one exemplary embodiment of a method for traversing a firewall security system according to this invention. Beginning in step S100, operation continues to step S110, where a connection is initiated by a device on a secure side of a first firewall to a server using a distributed network communication protocol that is normally allowed to pass through the firewall. Then, in step S120, the server determines whether the first device is authorized to communicate with the server by performing an authentication process. Next, in step S130, a determination is made whether the authentication information provided by the first device is valid. If so, operation continues to step S140. Otherwise, operation jumps to step S250.

In step S140, a determination is made whether the server contains any data and/or instructions that need to be downloaded to the first device. If so, operation continues to step S150. Otherwise, operation jumps directly to step S160. In step S150, the data and/or the instructions available at the server for the first device are downloaded to the first device in response to the communication initiated by the first device through the firewall to the server using the firewall-passable communications protocol. Operation then continues to step S160.

In step S160, a determination is made whether the first device has data and/or instructions that the first device wishes to make available to the server. If so, operation continues to step S170. Otherwise, operation jumps directly to step S180. In step S170, the data and/or instructions are uploaded by the client device through the firewall and over the distributed network to the server using the firewall-passable communications protocol. Operation then continues to step S180.

In step S180, a determination is made, based on the data and/or instructions provided by the first device to the server, whether data and/or instructions need to be provided from the server through a second firewall to a second device that is located on the secure side of the second firewall. If not, operation jumps to step S230. Otherwise, operation continues to step S190. In step S190, a communications path is established between the server and the second device on the secure side of the second firewall. Then, in step S200, the data and/or information received from the first device by the server is transmitted over the communication path to the second device. Next, in step S210, a determination is made whether data needs to be transmitted from the second device through the communications path across the second firewall to the server. If not, operation jumps to step S240. Otherwise, operation continues to step S220.

In step S220, the data and/or information from the second device is uploaded over the communication path and through the second firewall to the server. Then, in step S230, the server transmits the data and/or instructions received from the second device to the first device as a response to the communication initiated by the client device using the firewall-passable communications protocol so that the response from the server will pass through the first firewall to the first device without violating the security protocols of the first firewall or requiring the first firewall's security protocols to be relaxed to allow communication with the server. Then, in step S240, a determination is made whether further communications with the server by the first device are desired. If so, operation jumps back to step S140. Otherwise, operation continues to step S250, where operation of the method ends.

Figure 9:
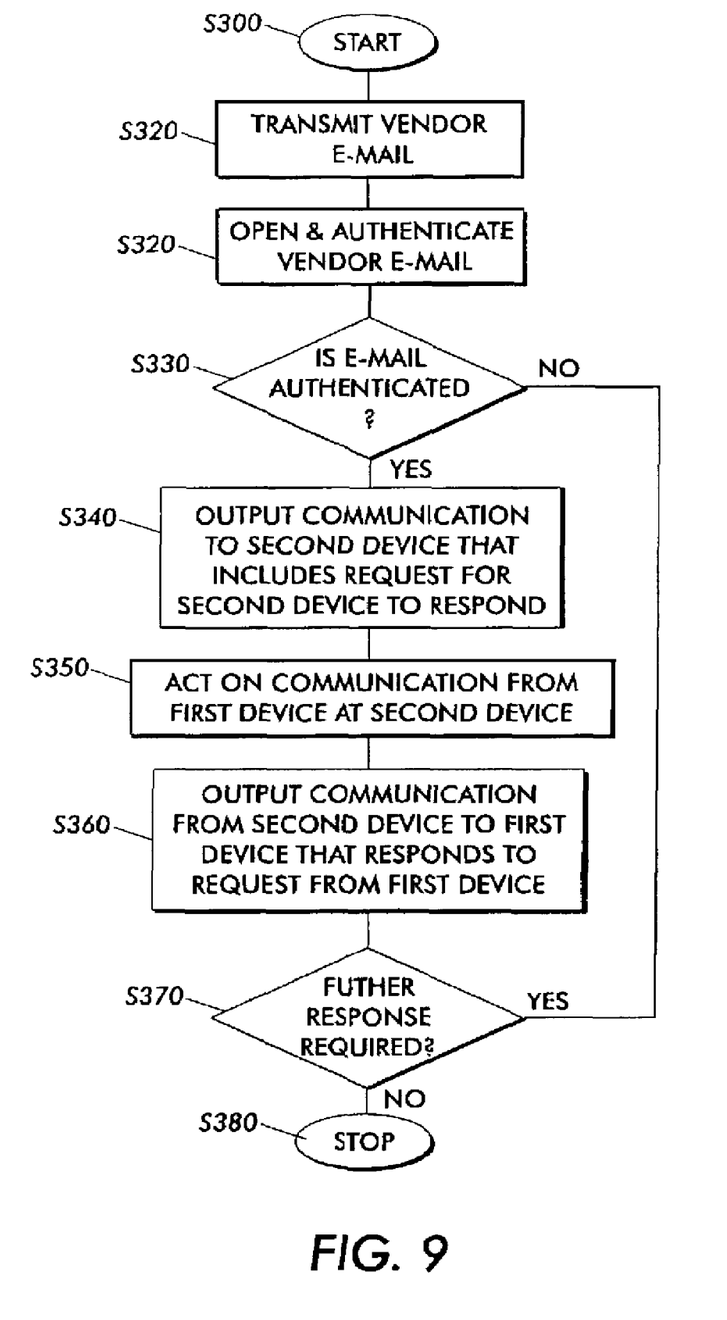
FIG. 9 is a flowchart outlining a second exemplary embodiment as a method for traversing firewall security systems according to this invention using electronic mail.

FIG. 9 is flowchart outlining a second exemplary embodiment of a method for traversing a firewall security system according to this invention. As shown in FIG. 9, operation of the method begins in step S300, and continues to step S310, where an e-mail message is transmitted by the server or second device over a distributed network and through a firewall to a first device that is located on a secure side of the first firewall. Then, in step S320, the e-mail received from the server and/or the second device is opened by the first device and authenticated. Next, in step S330, a determination is made by the first device whether the e-mail message has been authenticated to establish that it was transmitted by an authorized server and/or an authorized second device. If not, operation jumps to step S380. Otherwise, operation continues to step S340.

In step S340, in response to the first e-mail message, the first device sends a reply to the server and/or the second device using a communications protocol that the first firewall allows to pass through the first firewall. As part of this reply, the first device will pass any data and/or information that responds to the request in the e-mail communication from the server or second device received in step S310. Next, in step S350, in response to the reply from the first device, the server and/or the second device acts on and/or uses the data and/or information provided in response to the request output to the first device in step S310. In particular, the data and/or information transmitted by the first device is viewed by the firewall as a request initiated by the first device. The server and/or the second device, in step S350, acts on the request, which may imply that a response to the first device is necessary or desirable. Thus, in step S360, the server and/or second device outputs a communication to the first device that is in response to the request output by the first device in step S340.

Because this communication from the server and/or the second device is in the firewall-passable communications protocol and is in response to the request initiated by the first device, the firewall allows the downloaded data and/or instructions to pass through the firewall to the first device without violating the firewall security protocols and without requiring the security protocols of the firewall to be relaxed to allow the downloaded data and/or instructions to pass through the first firewall. Operation then continues to step S370.

In step S370, a determination is made at the first device whether the response from the server and/or second device includes another request for additional data and/or information, that is, whether any data and/or instructions need to be uploaded by the first device through the first firewall to the server and/or to the second device. If not, operation again jumps to step S380. Otherwise, operation returns to step S320. In step S380, operation of the method ends.

It should be appreciated that, in step S340, the data and/or instructions uploaded by the first device can be sent unencrypted or can be encrypted. It should also be appreciated that, if the response sent in step S360 does not need to be authenticated, rather than returning to step S320 from step S370, operation instead returns to step S340.

The key to the model/view/control architecture pattern is that when the client firewall allows only outbound HTTP communications, the second device can never initiate any communication with the first device. When trying to find out what is wrong with the first device from a remote location, for example, to save the cost for sending a service person to the site of the first device, the first device will have to start the communication. The first device sends the data and the reference page to the second device. The second device will then have access to the same information as the first device. The second device then responds to what the first device needs to do, either by providing a final answer or by asking more questions in the response. Since the first device has the model, by looking at the response from second device, the first device knows what to display to a user at the first device to get the question the second device wants answered or the question/answer has been completed.

While this invention has been described in conjunction with various exemplary embodiments, it is to be understood that may alternatives, modifications and variations would be apparent to those skilled in the art. Accordingly, Applicant's intent to embrace all such alternatives, modifications and variations that follow in the spirit and scope of this invention, in particular, while the exemplary embodiments described above involve a system and method for traversing firewall protection security systems, it is to be understood that the system and methods of this invention may be used with any suitable firewall traversal method.

What is claimed is:

1. A method for transferring information between a first image output device and a second device over at least one distributed network where the first image output device is on a secure side of a first firewall and the second device is on an unsecure side of the first firewall, the method comprising:

identifying and authorizing the second device to access the first image output device via a security circuit;

contacting the second device by the first image output device on a predefined, regularly scheduled basis;

sending an email message by the second device to the first image output device in response to being contacted by the first image output device;

transmitting information via a secure connection from the first image output device to the second device using a communication technique through the first firewall without violating a security policy of the first firewall, wherein the transmitting information is initiated by the email sent from the second device to the first image output device, the transmitted information including at least one of toner condition, photoreceptor status, and hardware status;

retrieving information via the secure connection by the first image output device from the second device by downloading a file through the first firewall without violating a security policy of the first firewall, wherein the file contains information for the first image output device;

diagnosing the first image output device by the second device based on the information transmitted occurring on a predefined regularly scheduled basis, wherein the retrieving information occurs only when the first image output device has authorization; and accessing the first image output device on the secure side of the first firewall by the second device upon system failure of the first image output device via a connectivity circuit to perform at least one of repair, diagnosis or updating of the first image output device, wherein the second device cannot contact the first image output device without first being contacted by the first image output device, but is able to access the first image output device in response to being contacted by the first image output device, and wherein the first image output device is a network connected printer.

2. The method of claim 1, wherein transmitting information from the first device to the second device comprises transmitting information from the first device to the second device using the hyper text transfer protocol.

3. The method of claim 2, wherein the second device is a server located on an unsecure side of a second firewall and connectable through the second firewall to a third device located on a secure side of the second firewall, the method further comprising transmitting information between the second device and the third device using a virtual private network.

4. The method of claim 1, wherein transmitting information from the first device to the second device comprises transmitting information from the first device to the second device by sending an e-mail message from the first device to the second device.

5. The method of claim 1, wherein transmitting information from the first image output device to the second device comprises transmitting information from the first image output device to the second device by sending a request from the first image output device to the second device for an HTML page to be downloaded from the second device to the first image output device.

6. The method of claim 1, wherein transmitting information from the second device to the first device comprises transmitting information from the second device to the first device using the hyper text transfer protocol.

7. The method of claim 1, wherein transmitting information from the second device to the first image output device comprises transmitting information from the second device to the first image output device by sending an e-mail message from the second device to the first image output device.

8. The method of claim 1, wherein transmitting information from the second device to the first image output device comprises downloading an HTML page from the second device to the first image output device in response to a request from the first image output device to the second device for the HTML page.

9. The method of claim 1, wherein the secure connection is a virtual private network connection.

10. The method of claim 1, wherein the diagnosing step includes downloading information from the second device to the first image output device, the downloaded information includes software updates.

11. The method of claim 1, further comprising:

transmitting the information from the second device to a third device; and providing the file by the third device to the second device based on the transmitted information, wherein the third device is located on a secure side of a second firewall.

* * * * *